United States Patent Office 2,860,164
Patented Nov. 11, 1958

2,860,164
CARBOXYMETHYLATION OF PRIMARY AND SECONDARY AMINES

Harry Kroll, Warwick, R. I., and Florence P. Butler, Amherst, Mass., assignors to Geigy Chemical Corporation, Ardsley, N. Y., a corporation of Delaware No Drawing. Application August 7, 1957
Serial No. 676,717

5 Claims. (Cl. 260—534)

The present application is in part a continuation of copending application Serial No. 510,534, filed May 23, 1955, now abandoned.

The present invention relates to the carboxymethylation of primary and secondary amines. It also relates to the preparation of salts of substituted α-amino acids and of substituted α-iminodiacetic acids.

Aminocarboxylic acids have heretofore been prepared by three general procedures:

(1) The reaction of sodium chloracetate with an amine to yield a sodium salt of an amino-carboxylic acid.
(2) The reaction of hydrogen cyanide, an aldehyde and an amine, under strongly acidic conditions, to yield an intermediate aminonitrile or aminopolynitrile which, by acid or alkaline hydrolysis is converted to the desired aminocarboxylic acid.
(3) The reaction of sodium cyanide, formaldehyde and an amine, in the presence of alkali and at an elevated temperature to yield the aminocarboxylic acid in a single step as the sodium salt.

Other methods for the preparation of aminocarboxylic and aminopolycarboxylic acids are known, but enumeration thereof will serve no useful purpose since they have no bearing on the present invention.

In the preparation of aminopolycarboxylic acids, such for example as ethylenediamine tetraacetic acid, it is known that when formaldehyde is added slowly to a solution containing sodium cyanide, a primary aliphatic amine, a secondary aliphatic amine, or an aliphatic polyamine containing primary or/and secondary nitrogen bases, and the solution heated between 60–110° C., carboxymethylation of the amine nitrogen takes place, and the sodium salt of the amino acid is formed. This method of preparation requires the continuous addition of formaldehyde to the reaction mixture since the sodium cyanide is added to the reactor with the initial charge. It is apparent that since this reaction is carried out under strongly alkaline conditions, hydrolysis of the sodium cyanide to sodium formate must occur to an appreciable extent. To overcome this difficulty, the process was modified so that only a portion of the sodium cyanide is added initially, and that as an equivalent portion of formaldehyde is added to the reaction mixture, a second equivalent of sodium cyanide is added to the reactor, followed by the controlled addition of the formaldehyde. This stepwise procedure is continued until the complete carboxymethylation of the amine is accomplished. Thus the conversion of ethylenediamine to the tetrasodium ethylenediamine tetraacetate requires four separate additions of sodium cyanide to the reactor at precisely timed intervals which in turn are dependent on the quantity of formaldehyde which has been added to the reactor.

In carrying out the above process, it is much more desirable to add the formaldehyde and the sodium cyanide to the reactor simultaneously, but this procedure is rather difficult to control in large scale operations. Furthermore solutions of sodium cyanide and formaldehyde are capable of undergoing strongly exothermic reactions when mixed, and it is therefore vital that no contact occur between these two reagents except in the actual reaction mixture.

It is apparent that although the direct carboxymethylation of amines by sodium cyanide and formaldehyde offers a convenient means for obtaining the sodium salts of aminopolycarboxylic acids in a single step, it has the disadvantage of requiring close supervision in order to maintain the correct rate of addition of sodium cyanide and formaldehyde.

A further disadvantage of this process is that it is limited to the preparation of the sodium and potassium salts of the aminopolycarboxylic acids. In some instances it is desirable to prepare salts other than that of the sodium salt of the amino acid in order to isolate the free amino acid. For example, it is pissible to isolate pure N-hydroxy-ethyliminodiacetic acid from its barium salt by the addition of the calculated amount of sulfuric acid thus precipitating the barium as the insoluble sulfate and leaving the free amino acid in solution. It is difficult to isolate the N-hydroxyethyliminodiacetic acid, free of inorganic salts, from the sodium salt of the acid.

The object of the present invention is to embody a procedure which is free of the prior art defects. According to the present invention the difficulties outlined above for the preparation of aminocarboxylic acids can be eliminated to a large extent by the use of glycolonitrile. When glycolonitrile (either absolute or in aqueous solution) is added portionwise to a primary or secondary amine in aqueous solution, and in the presence of a basic hydroxide of alkali metals or alkaline earths, or of a quaternary ammonium hydroxide, carboxymethylation of the amine takes place and the salt of the aminopolycarboxylic acid is formed corresponding to the base used in the reaction.

The use of glycolonitrile for the preparation of amino acids is known. However, where this reagent is used for this purpose, the intermediate aminoacetonitrile is isolated, and hydrolyzed under alkaline or acid conditions.

This reaction has been studied by Stewart and Li, and they have postulated the following mechanism:

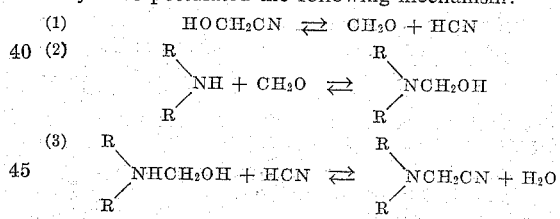

However, if one attempts to add a second mole of glycolonitrile to a primary amine to form an aminopolynitrile, only a very small amount of desired product is obtained. An example of this is the attempted conversion of ethylenediamine to ethylenediamine tetraacetonitrile by the addition of four moles of glycolonitrile to one mole of ethylenediamine. The first two moles of glycolonitrile can be added very rapidly, and it is possible to isolate the symmetrical ethylenediamine diacetic acid from a hydrolysate of the reaction at this point. However, the addition of the third and fourth mole of glycolonitrile takes place at a rate much slower than the decomposition of the glycolonitrile. As a result, the product obtained from this reaction contains decomposition products of glycolonitrile and little or no ethylenediamine tetraacetonitrile. It is therefore a further advantage of the glycolonitrile method according to the present invention that it permits the ready carboxymethylation of an amine already containing one carboxymethyl group.

If, according to this invention, the glycolonitrile is added to the solution or dispersion of the amine in the presence of alkaline reagents at an elevated temperature within the range from about 85° C. to the boiling point of the reaction mixture, and at normal, i. e. atmospheric, pressure or under slightly reduced pressure (e. g. a reduction of 1 to 5 inches of mercury), a smooth carboxymethylation of the amine is possible, evolved ammonia being removed. The slight pressure reduction is sometimes advantageous in that it facilitates the removal of the ammonia. The success of the process is dependent on the presence of strong bases, illustrative of which are sodium hydroxide, potassium hydroxide, lithium hydroxide, calcium hydroxide, barium hydroxide, tetra-kis(beta hydroxyethyl)ammonium hydroxide, and others, in an amount to assure a pH of at least 12 and in many cases 14 during the course of the reaction.

From a practical point of view, the addition of glycolonitrile to a solution of an amine is much easier to accomplish in large scale production than the regulated addition of a sodium cyanide solution and aqueous formaldehyde. Since the ratio of cyanide to formaldehyde in glycolonitrile is 1:1, the concentration of cyanide and formaldehyde is automatically controlled by the rate of addition of the glycolonitrile.

The process of the present invention is applicable generally to primary and secondary amines, i. e. amines having at least one replaceable hydrogen atom attached directly to an amino nitrogen atom may generally be employed to produce the carboxymethylated products herein described. Illustrative of these are for example, in addition to the aforementioned ethylenediamine, ethylamine, chloroethylamine, n-butylamine, dodecylamine, 1,2-propylenediamine, diethylenediamine, diethylenetriamine, triethylenetetramine, N-monoethoxy ethylenediamine, cyclohexylamine, and many others. The invention is, as aforesaid, also generally applicable to the carboxymethylation of amines which are already partly carboxymethylated.

The products of the invention have known utility as detergents, wetting agents and, particularly, as metal ion sequestering agents.

The following examples set forth representative embodiments of the present invention. In the said examples, the parts and percentages are by weight; the temperatures are in degrees centigrade.

*Example 1*

To a mixture of 60 parts of aqueous ethylenediamine of 50% strength and 200 parts of aqueous sodium hydroxide solution of 50% strength, 379 parts of aqueous glycolonitrile of 33% strength are added in the course of five hours, at reflux temperature and under a pressure of 635 to 735 millimeters of Hg (i. e. a slightly reduced pressure relative to atmospheric pressure). The mixture is held at reflux temperature for a further half hour, and is then cooled and acidified to pH 2 with sulfuric acid. The resultant ethylenediamine tetraacetic acid is separated by filtration and is washed free of sulfate. Yield: 133 parts (91% of the theoretical yield).

*Example 2*

264 parts of aqueous tetraethanolammonium hydroxide of 40% strength are added to 12 parts of aqueous ethylenediamine of 50% strength. The mixture is maintained at reflux temperature under slightly reduced pressure (635 to 735 millimeters of Hg) while 76 parts of aqueous glycolonitrile of 33% strength are added in the course of three hours. The resulting dark solution is held at reflux for a half hour longer and is then treated with decolorizing carbon. A 10 parts sample of the reaction product—ethylenediamine tetra-acetic acid—chelates 35.3 parts by weight of calcium. The reaction mixture prevents the precipitation of ferric ion in alkaline solutions.

*Example 3*

An apparatus which is equipped with a thermometer, agitator, water-cooled reflux condenser and dropping funnel, and which is at atmospheric pressure, is charged with 69.5 parts of aqueous ethylenediamine of 86.5% strength, 200 parts of water and 368 parts (15% excess) of aqueous sodium hydroxide solution of 50% strength. The solution is heated to 100° and 368.5 parts (5% excess) of aqueous glycolonitrile of 65% strength are added slowly over a period of 3–3¼ hours at 102–104° beneath the surface. The cooling water is drained from the reflux condenser after ½ of the amount of glycolonitrile is added. The reaction mixture is then heated for 15 minutes at 104°. Excess sodium cyanide which is formed is reacted with about 4.86 parts of 37% aqueous formaldehyde at this temperature. On completion of the very slow addition of formaldehyde, the cyanide content is less than 5 parts per million. The reaction mixture is then distilled to remove all ammonia. Water is added if required to maintain a concentration of about 30% of tetrasodium ethylenediamine tetraacetate. The solution is then cooled to 60° and 1 part of 35% hydrogen peroxide is added. After stirring for ½ hour, addition of 1 part of decolorizing carbon and stirring for another ½ hour the solution is filtered at 60°. The yield is 97.5% of the theory.

To convert the tetrasodium ethylenediamine tetraacetate into its free acid, 235 parts of 96% sulfuric acid are slowly added, while cooling, to 937 parts of 39.1% tetrasodium ethylenediamine tetraacetate at 60–65° and 600 parts of water. The final pH is 2.0. The so-obtained slurry is then cooled in 1 hour to 32–34°, stirred for 1 hour and filtered off. The precipitate is then washed with water at 20° until no sulfate can be traced in the filtrate. The ethylenediamine tetraacetic acid is dried overnight at 110°. The yield is 94.5% of the theory.

When using an equimolar amount of glycolonitrile (no excess) and an initial addition of sodium cyanide on a 5% excess basis, the yield of tetrasodium ethylenediamine tetraacetate is increased to 99.6%, whereas the yield of the free acid goes up to 98.5%.

*Example 4*

To a mixture of 60 parts of aqueous ethylenediamine of 50% strength and about 70 parts of aqueous lithium hydroxide solution of 50% strength, there are added in the course of five hours, at reflux temperature and under a slightly reduced pressure (635 to 735 millimeters of Hg), 379 parts of aqueous glycolonitrile of 33% strength. The mixture is held at reflux temperature for a further half hour, and is then cooled and acidified with sulfuric acid, whereupon 90.5% of the theoretical yield of ethylenediamine tetraacetic acid is isolated by filtration and washing free of sulfate. Upon evaporation substantially to dryness of the remainder of the reaction mixture, the lithium salt of ethylenediamine tetraacetic acid is obtained. The resulting crystalline cake can be freed of excess lithium hydroxide by washing with alcohol.

*Example 5*

379 parts of aqueous glycolonitrile of 33% strength are added to a mixture of 60 parts of aqueous ethylenediamine of 50% strength, 225 parts of 98% triethanolamine and 200 parts of aqueous sodium hydroxide solution of 50% strength, at reflux temperature and at 3.5 inches (Hg) of vacuum (i. e. at a pressure of about 672.5 mm.) in the course of 2 and ½ hours. The reaction mixture is maintained at reflux temperature for a further half hour, and then treated with decolorizing carbon and filtered. The resulting amber solution contains 123 parts (or 84.2% of the theoretical yield) of ethylenediamine tetraacetic acid, and prevents the precipitation of ferric ion in alkaline solution.

*Example 6*

The procedure according to Example 1 is carried out as therein described, except that the reaction temperature is 85°. The resultant ethylenediamine tetraacetic acid is obtained in a yield of 73%.

Example 7

The procedure according to Example 1 is carried out as therein described, except that the reaction temperature is 95°. The resultant ethylenediamine tetraacetic acid is obtained in a yield of 76.8%.

Example 8

The procedure according to Example 1 is carried out as therein described, except that 185 parts of 50% sodium hydroxide (= a 4.55% excess of sodium hydroxide over glycolonitrile) are used in lieu of the 200 parts (= a 13.6% excess of sodium hydroxide over glycolonitrile). The resultant ethylenediamine tetraacetic acid is obtained in a yield of 78.1%.

Example 9

To 1500 parts of methyl Cellosolve (ethylene glycol monomethyl ether) and 388 parts of sodium hydroxide in 1500 parts of water, there are added, while stirring, 874 parts of dodecylamine, and the temperature of the mixture raised to 102°. To the resultant solution, 716 parts of aqueous glycolonitrile of 70% strength are added over a five hour interval. After the nitrile addition is completed, the solution is heated under a pressure reduction of two to three inches of mercury (i. e. at 685–710 mm. Hg) for ten hours to remove the ammonia formed in the reaction.

The solution is then diluted with 1000 parts of water, and 3220 parts of 3 N-hydrochloric acid are added, the temperature being maintained at 100°. The resultant slurry is cooled to 15° and the product filtered, washed with water, and dried. The product (1213 parts) contains 87% of dodecyliminodiacetic acid, 12.5% of dodecylglycine, and about 3% of sodium chloride.

Example 10

2500 parts of water containing 2980 parts of 50% aqueous sodium hydroxide solution are mixed with 3150 parts of diethanolamine. The temperature of the solution is raised to 105–110°, and a vacuum between 3 and 4 inches of Hg is applied, i. e. a pressure of 660–685 mm. Hg is employed. 2690 parts of 70% glycolonitrile are added dropwise over a seven hour period. After the glycolonitrile has been completely added, the temperature is maintained at 110° for an additional 30 minutes. The solution is cooled. The yield is 10,473 parts of 46.5% solution of the monosodium salts of dihydroxyethylglycine.

Example 11

392 parts of diethanolamine are cooled to 20° and 310 parts of aqueous glycolonitrile of 70% strength are added at atmospheric pressure at such a rate that the temperature does not rise above 50°. The mixture is then kept for 2 hours at 50° whereupon it is again cooled to 20°. 702 parts of the so-obtained dihydroxyethyl aminoacetonitrile are then added over a period of ¾–1 hour at 90° to 546 parts of water and 364 parts of 50% aqueous sodium hydroxide solution. On completion of the addition the reaction mixture is heated to 95–100° and kept at this temperature for 2 hours. The mixture is adjusted to 50% concentration, decolorized at 50° by the addition of 35 parts of activated charcoal and filtered. The yield is 1375 parts of straw-colored 50% aqueous solution of the monosodium salt of dihydroxyethyl glycine (98% of theory).

Example 12

75 parts of glycine are dissolved in an aqueous solution of 160 parts of 50% aqueous sodium hydroxide solution and 150 parts of water. The temperature of the solution is raised to 105° and a vacuum corresponding to 4 inches of mercury is applied. 81 parts of 70% glycolonitrile dissolved in 70 parts of water are added dropwise to the solution in three hours. After the ammonia is completely removed from the solution, it is decolorized by the addition of 5 parts of activated charcoal and filtered. The cooled solution, 526 parts, contains a mixture of the sodium salts of iminodiacetic acid and iminotriacetic acid.

In analogous manner, other carboxymethylated compounds such for example as aminopropionic acid, aminoisovaleric acid, aminophenylpropionic acid, etc. can be further carboxymethylated.

Example 13

Apparatus equipped with an agitator, thermometer, air reflux condenser, and dropping funnel is charged at atmospheric pressure with 100 parts of water, 276 parts (15% excess) of 50% aqueous sodium hydroxide solution and 104 parts of 100% aminoethylethanolamine. The resulting solution is heated to 105–108°. 359 parts of 50% glycolonitrile are then added beneath the surface over a period of 2½–3 hours at 106–108°. Heating is continued for 15 minutes and an amount of 37% formaldehyde equivalent to the unreacted cyanide (plus 10–20% excess) is added at 108° to decrease the cyanide content to less than 5 p. p. m. Distillation is continued until all ammonia is removed. The solution is then cooled to 60–70° and 1 part of hydrogen peroxide is added. After stirring for ½ hour at 60°, the reaction mixture is cooled to room temperature. The yield is 98–100% in solution or 337–344 parts of trisodium hydroxyethylethylenediamine triacetate.

Having thus disclosed the invention, what is claimed is:

1. A method of carboxymethylating an aliphatic amine having at least one replaceable hydrogen atom attached directly to an amino nitrogen atom, which comprises continuously adding an aqueous solution of glycolonitrile to an aqueous solution of the said amine containing ab initio sufficient strong base to maintain a pH of at least 12 throughout the reaction, and maintaining the reaction mixture at said pH and at a temperature within the range from about 85° C. to the boiling point of the mixture.

2. A method of carboxymethylating an aliphatic primary amine, which comprises continuously adding an aqueous solution of glycolonitrile to an aqueous solution of the said amine containing ab initio sufficient strong base to maintain a pH of at least 12 throughout the reaction, and maintaining the reaction mixture at said pH and at a temperature within the range from about 85° C. to the boiling point of the mixture.

3. A method of carboxymethylating an aliphatic secondary amine, which comprises continuously adding an aqueous solution of glycolonitrile to an aqueous solution of the said amine containing ab initio sufficient strong base to maintain a pH of at least 12 throughout the reaction, and maintaining the reaction mixture at said pH and at a temperature within the range from about 85° C. to the boiling point of the mixture.

4. A method of carboxymethylating an aliphatic carboxymethylated amine having at least one replaceable hydrogen atom attached directly to an amino nitrogen atom, which comprises continuously adding an aqueous solution of glycolonitrile to an aqueous solution of the said amine containing ab initio sufficient base to maintain a pH of at least 12 throughout the reaction, and maintaining the reaction mixture at said pH and at a temperature within the range from about 85° C. to the boiling point of the mixture.

5. A method of carboxymethylating ethylenediamine which comprises continuously adding an aqueous solution of glycolonitrile to an aqueous solution of the said amine containing ab initio sufficient strong base to maintain a pH of at least 12 throughout the reaction, and maintaining the reaction mixture at said pH and at a temperature within the range from about 85° C. to the boiling point of the mixture.

References Cited in the file of this patent

Smith: Journal of Organic Chemistry, vol. 14 (1949), pp. 355–60.